US008411868B2

(12) United States Patent
Long et al.

(10) Patent No.: US 8,411,868 B2
(45) Date of Patent: Apr. 2, 2013

(54) INTRUDER TRACEABILITY FOR SHARED SECURITY ASSOCIATIONS

(75) Inventors: Men Long, Hillsboro, OR (US); David Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1393 days.

(21) Appl. No.: 11/694,717

(22) Filed: Mar. 30, 2007

(65) Prior Publication Data
US 2008/0240446 A1 Oct. 2, 2008

(51) Int. Cl.
*H04L 29/06* (2006.01)
(52) U.S. Cl. ........................................ 380/282
(58) Field of Classification Search .......... 380/278, 380/277, 279
See application file for complete search history.

(56) References Cited

U.S. PATENT DOCUMENTS

| | | | | |
|---|---|---|---|---|
| 5,592,552 | A * | 1/1997 | Fiat | 713/163 |
| 5,963,642 | A * | 10/1999 | Goldstein | 713/193 |
| 6,363,154 | B1 * | 3/2002 | Peyravian et al. | 380/283 |
| 6,785,809 | B1 * | 8/2004 | Hardjono | 713/163 |
| 6,813,714 | B1 * | 11/2004 | Hardjono et al. | 726/14 |
| 6,959,089 | B1 * | 10/2005 | Sprunk | 380/239 |
| 7,234,063 | B1 * | 6/2007 | Baugher et al. | 713/189 |
| 2002/0012433 | A1 * | 1/2002 | Haverinen et al. | 380/247 |
| 2005/0050004 | A1 * | 3/2005 | Sheu et al. | 707/1 |
| 2006/0031675 | A1 * | 2/2006 | Zhang et al. | 713/168 |
| 2006/0140411 | A1 * | 6/2006 | Zhu | 380/277 |
| 2006/0265515 | A1 * | 11/2006 | Shiga et al. | 709/238 |

OTHER PUBLICATIONS

Wen-Guey Tzeng; A time-bound cryptographic key assignment scheme for access control in a hierarchy; Knowledge and Data Engineering, IEEE Transactions on (1041-4347), Jan.-Feb. 2002. vol. 14,Iss.1; p. 182-188.*
Teresa F. Lunt; Detecting Intruders in Computer Systems;1993 Conference on Auditing and Computer Technology.*
Rafaeli, Sandro and Hutchinson, David; A Survey of Key Management for Secure Group Communication; ACM Computing Surveys (0360-0300); Sep. 1, 2003. vol. 35,Iss.3;p. 309-329.*
Zhang et al, Gossip-based multicast loss recovery mechanisms in group key distribution, The Fifth International Conference on Computer and Information Technology CIT 2005, Conf date Sep. 21-23, 2005, pp. 429-434.*

* cited by examiner

*Primary Examiner* — David Pearson
(74) *Attorney, Agent, or Firm* — Kacvinsky Daisak PLLC

(57) ABSTRACT

Various embodiments are directed to systems and techniques for shared security associations. In one or more embodiments, a key distribution server provides shared security associations for clients and servers by assigning a group key to a particular client according to a time-based group key assignment schedule. The key distribution server may comprise a recursive codebook including multiple entries corresponding to group key assignments to be selected by the key distribution server with respect to time intervals. Other embodiments are described and claimed.

13 Claims, 4 Drawing Sheets

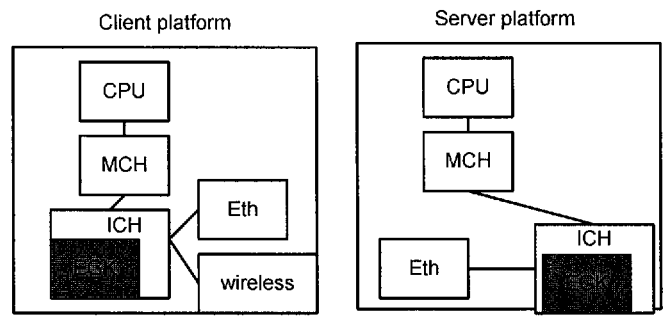
FIG. 5A  FIG. 5B
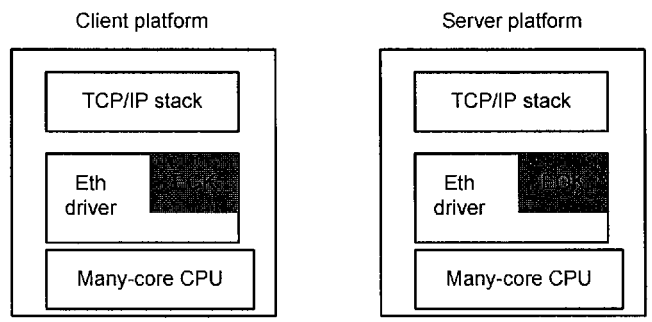
FIG. 6A  FIG. 6B

INTRUDER TRACEABILITY FOR SHARED SECURITY ASSOCIATIONS

BACKGROUND

One trend in the information technology (IT) industry is moving to end-to-end security solutions. The implication for an enterprise is that a server has to handle thousands of security associations at a time. For the forensics and auditing, tracking that many security associations is not an easy task in terms of IT computing resources. Due to the cost of cryptography hardware, it is expensive to store thousands of keys and their associate information in hardware buffers and perform cryptography operations for individual security associations. Even if such keys were to be stored in the main memory, the delay caused by fetching the corresponding key for a frame would significantly increase the latency for processing a packet in hardware. Thus, the frames of a 10 Gbps link may congest at the hardware buffer and undergo undesirable packet drop.

Additionally, point-to-point security associations require unique session keys that are typically established at the start of each session. Negotiating these session keys is time consuming using a Diffie-Hellman key exchange and adds substantial protocol overhead. For example, to exchange a single data packet might require negotiation involving the exchange of several additional packets to establish the new session.

In a corporate intranet, it is feasible to deploy group-based security schemes involving shared security association where a few clients share the same key with an application server. Then, the application server can use one key to process all the packets coming from those clients. As such, the number of security associations can be reduced and the keys can be installed in the hardware, which is attractive for an economic solution to high-speed hardware security associations.

However, while shared key solutions remove the need for high latency session negotiation overhead and key management complexity by allowing trusted devices to use the same session key for cryptographic operations, compromises are nearly impossible to trace back to the source causing potential security vulnerability.

BRIEF DESCRIPTION OF THE DRAWINGS

FIGS. 5A and 5B illustrate embodiments of a hardware implementation.

FIGS. 6A and 6B illustrate embodiments of a software implementation.

DETAILED DESCRIPTION

Various embodiments are directed to intruder traceability for shared security associations. Numerous specific details are set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is worthy to note that any reference to "one embodiment" or "an embodiment" means that a particular feature, structure, or characteristic described in connection with the embodiment is included in at least one embodiment. The appearances of the phrase "in one embodiment" are not necessarily all referring to the same embodiment.

Figure 1:
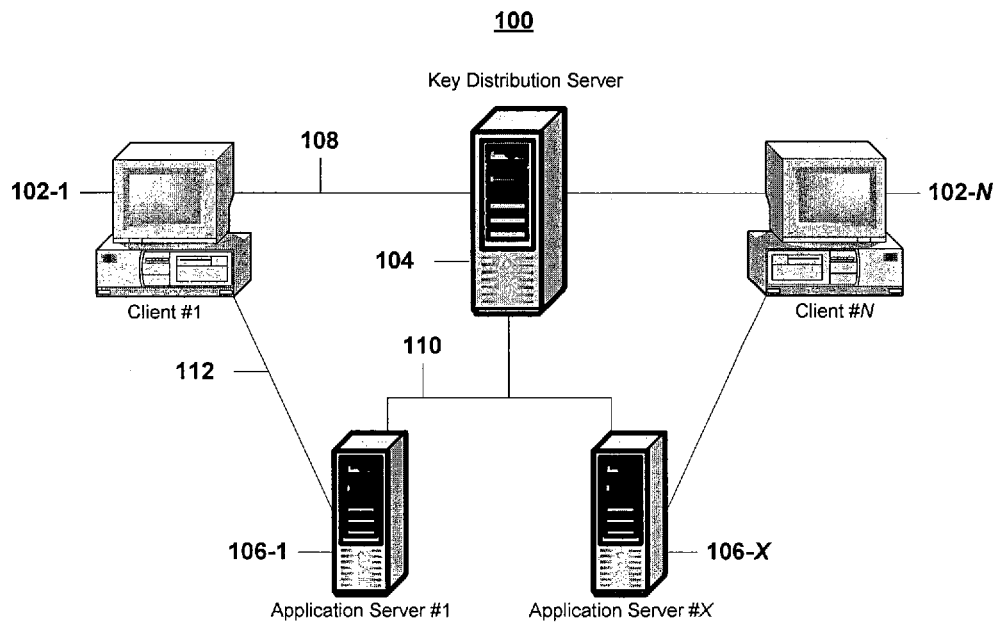
FIG. 1 illustrates an embodiment of a communications system.

FIG. 1 illustrates a block diagram of an embodiment of a communications system 100. As shown, the communications system 100 may comprise multiple nodes including clients 102-1-N, key distribution server 104, and application servers 106-1-X, where N and X generally may represent any positive integer value. Although FIG. 1 may show a limited number of nodes by way of example, it can be appreciated that more or less nodes may be employed for a given implementation. A node generally may comprise any physical or logical entity for communicating information in the communications system 100 and may be implemented as hardware, software, or any combination thereof, as desired for a given set of design parameters or performance constraints.

In some embodiments, a node may comprise, or be implemented as, a computer system, computer sub-system, computer, appliance, workstation, terminal, server, personal computer (PC), laptop, handheld computer, personal digital assistant (PDA), telephone, mobile telephone, combination mobile telephone/PDA, set top box (STB), pager, messaging device, media player, digital music player, wireless access point, base station (BS), subscriber station (SS), mobile subscriber center (MSC), radio network controller (RNC), microprocessor, integrated circuit such as an application specific integrated circuit (ASIC), programmable logic device (PLD), processor such as general purpose processor, digital signal processor (DSP) and/or network processor, interface, input/output (I/O) device (e.g., keyboard, mouse, display, printer), router, hub, gateway, bridge, switch, circuit, logic gate, register, semiconductor device, chip, transistor, or any other device, machine, tool, equipment, component, or combination thereof.

In some embodiments, a node may comprise, or be implemented as, software, a software module, application, program, subroutine, instruction set, computing code, words, values, symbols or combination thereof. A node may be implemented according to a predefined computer language, manner or syntax, for instructing a computer system to perform a certain function. Examples of a computer language may include C, C++, Java, BASIC, Perl, Matlab, Pascal, Visual BASIC, assembly language, machine code, microcode for a network processor, and so forth.

The nodes of the communications system 100 may be arranged to communicate one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner. The media and control information may be communicated from and to a number of different devices or networks.

In various embodiments, the communications system 100 may comprise, or form part of a wired communications system, a wireless communications system, or a combination of both. Although certain embodiments may be illustrated using a particular communications media by way of example, it may be appreciated that the principles and techniques discussed herein may be implemented using various communication media and accompanying technology.

The communications system 100 may include one or more nodes arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth.

The communications system 100 also may include one or more nodes arranged to communicate information over one or more types of wireless communication links. Examples of a wireless communication link may include, without limitation, a radio channel, satellite channel, television channel, broadcast channel infrared channel, radio-frequency (RF) channel, Wireless Fidelity (WiFi) channel, a portion of the RF spectrum, and/or one or more licensed or license-free frequency bands. When implemented as a wireless device, a node may comprise one more wireless interfaces and/or components for wireless communication such as one or more transmitters, receivers, transceivers, chipsets, amplifiers, filters, control logic, network interface cards (NICs), antennas, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth.

The communications system 100 may communicate information in accordance with one or more standards as promulgated by a standards organization, such as the International Telecommunications Union (ITU), the International Organization for Standardization (ISO), the International Electrotechnical Commission (IEC), the Institute of Electrical and Electronics Engineers (IEEE), the Internet Engineering Task Force (IETF), and so forth. In various embodiments, for example, the communications system 100 may communicate information according to one or more IEEE 802 standards including IEEE 802.3 standards for Ethernet based local area networks (LANs), IEEE 802.11 standards for wireless local area networks (WLANs), and/or IEEE 802.16 standards for wireless metropolitan area networks (WMANs). The embodiments are not limited in this context.

The communications system 100 may communicate information in accordance with one or more protocols. A protocol may comprise a set of predefined rules or instructions for managing communication among nodes. In various embodiments, for example, the communications system 100 may employ one or more protocols such as medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), and so forth.

In various embodiments, the communications system 100 may communicate information in accordance with one or more security protocols such as cryptographic and/or encryption protocols. Examples of security protocols include, without limitation, public key protocols, network access protection (NAP) protocols, network admission control (NAC) protocols, IP security (Ipsec) protocols, IEEE 802.1 ae protocols, cyclic redundancy check (CRC) protocols, Secure Socket Layer (SSL), Transport Layer Security (TLS) protocols, Linksec protocols, and other Layer 2 (L2) or Layer 3 (L3) security protocols. It can be appreciated that other suitable security protocols and/or security mechanisms which are consistent with the described embodiments may be used.

In various embodiments, the clients 102-1-N, key distribution server 104, and application servers 106-1-X may form part of a secure network. The secure network may comprise or be implemented as a virtual private network (VPN), local area network (LAN), Ethernet, intranet, WLAN, WMAN, WPAN, WWAN, or other type of private communications network. It can be appreciated that other suitable communications networks which are consistent with the described embodiments may be used.

The key distribution server 104 may be arranged to provide shared security associations for the clients 102-1-N and servers 106-1-X. In various embodiments, the key distribution server 104 may be arranged to establish group key based security associations among the clients 102-1-N and servers 106-1-X. The key distribution server 104 may be arranged to assign group keys to clients 102-1-N according to a group key assignment schedule. The key distribution server 104 may be provide the group keys to the application servers 106-1-X to enable secure communication among clients 102-1-N and application servers 106-1-X. In various implementations, the key distribution server 104 may be arranged to calculate a group key assignment schedule as follows.

For purposes of illustration, and not limitation, assume there are N clients (e.g., clients 102-1-N), and let g denote the number of clients in one group. Thus, the number of groups M can be:

$$M = \begin{cases} N/g & g/N \\ \lceil N/g \rceil & \text{otherwise} \end{cases} \quad (1)$$

To construct the group key assignment schedule, the key distribution server 104 may implement a recursive codebook to store group key assignments. The codebook may comprise multiple entries denoted as $\Omega_0, \Omega_1, \Omega_2, \ldots$. Each entry of the codebook may correspond to a specific group-key assignment over the clients 102-1-N.

In one or more embodiments, the key distribution server 104 may be arranged to assign group keys to the client 102-1-N according to a time-based schedule. For example, time may divided into consecutive time intervals $(t_1, t_2, t_3, \ldots)$. The time intervals may correspond to days, hours, minutes, and so forth. The key distribution server 104 may randomly select entries from the codebook with respect to the time intervals.

For a given time interval, the distribution server 104 finds a particular entry in the recursive codebook. The distribution server 104 identifies the segment or group within the entry to which the particular client belongs. The key distribution server 104 then provides the particular client with the corresponding group key for the identified group or segment. Each of the clients 102-1-N may use standard public key protocol to obtain the corresponding group keys from the key distribution server 104. For example, the key distribution server 104 may provide the client 102-1 with its corresponding group key through secure channel 108.

The key distribution server 104 may provide the group keys to application servers 106-1-X. The clients 102-1-N then may use the corresponding group keys to communicate with the application servers 106-1-X. The key distribution server 104 may use standard public key protocol to deliver the group keys to application servers 106-1-X. For example, the key distribution server 104 may deliver the group keys for an interval to the application server 106-1 through secure channel 110. The client 102-1 then may communicate with the application server 106-1 through channel 112 using its corresponding group key.

In one or more embodiments, the recursive codebook may be constructed according to a group key assignment schedule calculated as follows:

1. Define the entry i=0 for the codebook
2. $\Omega_i$ is the ordered list from 1 to N: {1||2||3|| . . . ||N}
3. Divide $\Omega_0$ into M segments.
4. Define block:=segment
5. If the block contains only one element, go to Step 10
6. i=i+1
7. For each block, subdivide it into M units//the notation unit(1, 2) means block 1 and its sub-block 2
8. For each segment j∈[1,M], reconstruct itself as unit(1,j)|| unit(2,j) unit(3,j)|| unit(4,j)|| . . . || unit($M^i$,j), define the new list as entry $\Omega_i$
9. Block:=unit, and go to Step 5
10. Quit From the above construction of the group key assignment schedule, the size of the codebook or the number of entries in the codebook is:

$$L = \log_M N, \quad (2)$$

where M is the number of groups and N is the number of hosts.

Figure 2:
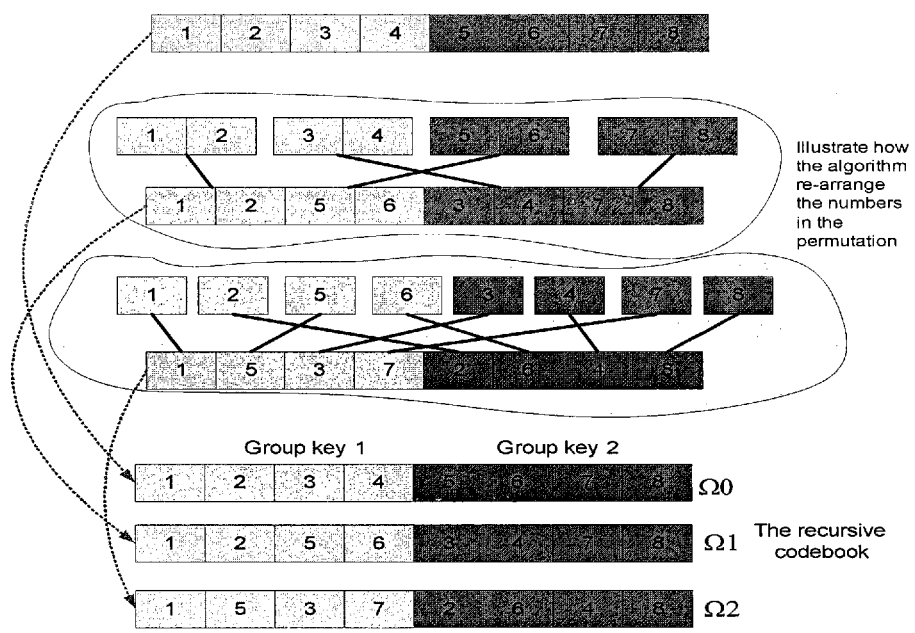
FIG. 2 illustrates an embodiment of recursive codebook construction.

FIG. 2 illustrates construction of a recursive codebook and the resultant entries according to one or more embodiments. As shown, there are eight clients (N=8) and two groups (M=2). The first four elements in any entry will be assigned group key 1 and the last four elements in any entry will be assigned group key 2.

The codebook comprises three entries $\Omega_0$, $\Omega_1$, and $\Omega_2$. Each of the entries $\Omega_0$, $\Omega_1$, and $\Omega_2$ comprises a first group including randomly selected clients to be assigned group key 1 and a second group including randomly selected clients to be assigned group key 2. As shown, the first entry $\Omega_0$ comprises a first group comprising clients {1,2,3,4} to be assigned group key 1 and a second group comprising clients {5,6,7,8} to be assigned group key 2. The second entry $\Omega_2$ comprises a first group including clients {1,2,5,6} to be assigned group key 1 and a second group including clients {3,4,7,8} to be assigned group key 2. The third entry $\Omega_2$ comprises a first group including clients {1,5,3,7} to be assigned group key 1 and a second group including clients {2,6,4,8} in the second group to be assigned group key 2.

The codebook entries $\Omega_0$, $\Omega_1$, and $\Omega_2$ may be randomly selected with respect to time intervals. The time intervals may correspond to weeks, days, hours, minutes, and so forth. Table 1 below depicts an exemplary group key assignment with respect to time intervals based on the codebook of FIG. 3.

TABLE 1

| | Time interval | | | | | | | | |
|---|---|---|---|---|---|---|---|---|---|
| | 1 | 2 | 3 | 4 | 5 | 6 | 7 | 8 | 9 |
| Codebook entry | Ω0 | Ω2 | Ω0 | Ω1 | Ω2 | Ω0 | Ω2 | Ω1 | Ω1 |

From FIG. 2 and Table 1, the following can be observed for client 2 and client 6, where K(t,k) denotes group key K at time interval t and group key number k.

1. At time interval 1, client 2 is assigned group key K(1,1), and client 6 is assigned group key K(1,2).
2. At time interval 2, client 2 is assigned group key K(2,2), and client 6 is assigned group key K(2,2).
3. At time interval 3, client 2 is assigned group key K(3,1), and client 6 is assigned group key K(3,2)
4. At time interval 4, client 2 is assigned group key K(4,1), and client 6 is assigned group key K(4,1).

Figure 3:
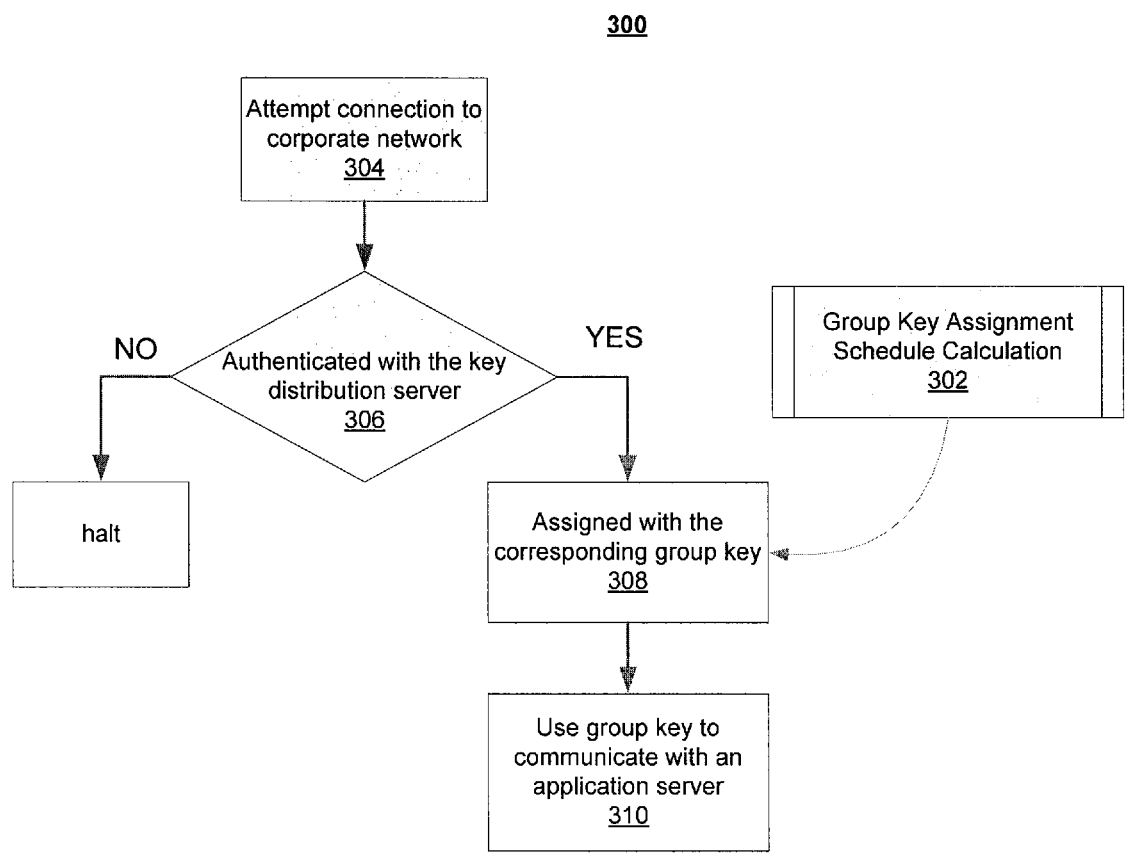
FIG. 3 illustrates an embodiment of a group key based logic flow.

FIG. 3 illustrates an embodiment of a group key based logic flow 300. At block 302, group key assignment schedule is calculated, as described above. At block 304, a client (or host) may attempt a connection to a corporate network. At block 306, the client is authenticated with the key distribution server; otherwise, the process is halted. At block 308, the client is assigned a corresponding group key. In one or more embodiments, assigning the corresponding group key may comprise finding an entry for the interval in the group key assignment (e.g., Table 1), finding the client belonging to which segment in the entry of the interval at the codebook (e.g., see FIG. 2), and giving the corresponding group key to the client through a secure channel. At block 310, the client uses the group key to communicate with an application server.

Figure 4:
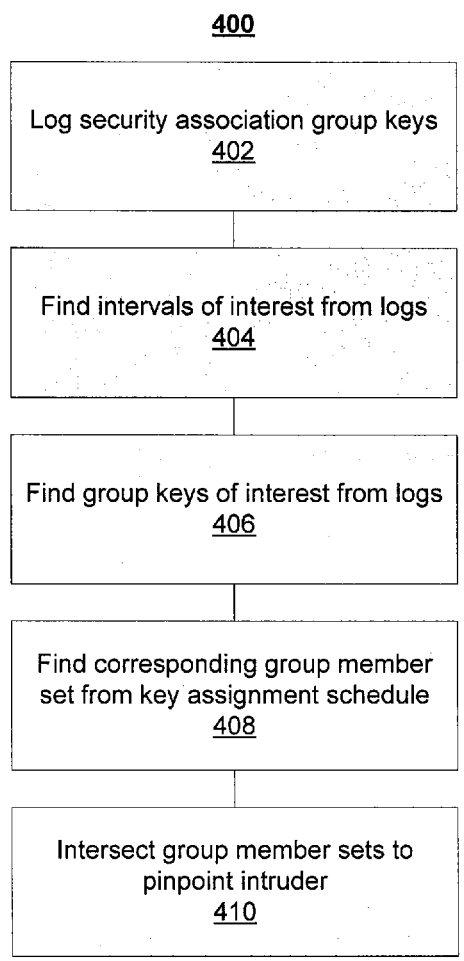
FIG. 4 illustrates an embodiment of an intruder tracing logic flow.

FIG. 4 illustrates an embodiment of an intruder tracing logic flow 400. In various implementations, the logic flow 400 may be arranged to identify or pinpoint a client using a recursive codebook implemented by a key distribution sever. In one or more embodiments, the logic flow 400 may be implemented as a software program for IT to analyze application server security association logs to accurately trace the intruders that compromise the client platforms and impersonate a legitimate user.

At block 402, At block 404, the intervals of interest (e.g., a1, a2, a3, . . . ) are found from the logs. At block 406, the group keys of interest (e.g., b1, b2, b3, . . . ) are found from the logs. At block 408, the corresponding group member set S[a1,b1], S[a2,b2], . . . are found from the key assignment schedule. At block 410, the group member sets are intersected to pinpoint the intruder.

For purposes of illustration, and not limitation, the follow example further describes tracing intruders. Suppose time intervals 4-6 are the time intervals interest, and the group keys of interest are K(4,2), K(5,1), and K(6,2). The corresponding member sets of clients found from the codebook lookup are {3,4,7,8}, {1,5,3,7}, and {5,6,7,8}. It can be appreciated that the intersection is client 7.

In another instance, if the intervals of interest are 4,5,7, and 8, and the group keys of interest are K(4,2), K(5,1), K(7,1) and K(8,1), the corresponding member sets of clients obtained are: {3,4,7,8}, {1,5,3,7}, {1,2,5,6}, and {1,5,3,7}. Here, a null element is observed in the intersection of the group sets. The reason is that one client cannot get two different group keys under one entry of the codebook. In this case, either of the "conflict" choices is dropped and the intersection is obtained. If K(4,2) is dropped, the intersection will be {client 1, client 5}.

FIGS. 5A and 5B illustrate various embodiments of hardware implementations. As shown, an enterprise group key (EGK) may be implemented in hardware (e.g., chipset) by an IO controller hub (ICH) coupled to a memory controller hub (MCH) within a client platform or server platform. The embodiments are not limited in this context.

FIGS. 6A and 6B illustrate various embodiments of software implementations. As shown, the EGK may be implemented in hardware by an Ethernet driver between the TCP/IP stack and many-core CPU within a client platform or server platform. The embodiments are not limited in this context.

Figure 7A:
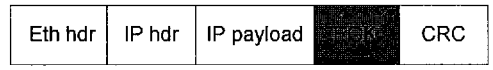
FIGS. 7A-7C illustrate embodiments of usage models.
Figure 7B:
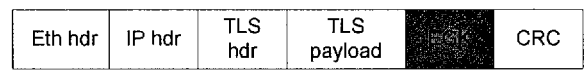
Figure 7C:
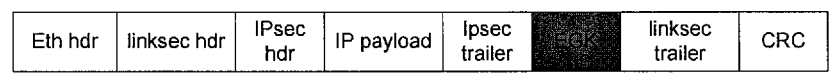

FIGS. 7A-7C illustrate various embodiments of usage models. As shown in FIG. 7A, the EGK may be implemented within a field of a frame (FIG. 7A) to provide security and auditability. The EGK also may be implemented in a SSL/TLS frame (FIG. 7B) or a frame with Linksec and IPsec (FIG. 7C). The embodiments are not limited in this context.

In various implementations, the described embodiments may enable platforms to achieve both high performance and intruder-traceability for end-to-end security solutions for enterprise networking by combining the performance and scalability advantages of shared-key approaches with the auditability and traceability advantages of point-to-point security associations. The described embodiments may help hardware to support end-to-end security solutions and forensics/secure auditing by IT.

In some implementations, the described embodiments may remove the need for upgrading switches and routers required for hop-by-hop security mechanism such as IEEE 802.1ae. At the same time, existing enterprise investments in AAA servers and models for shared key distribution may be utilized. Furthermore, IT manageability burdens for deploying security may be reduced by simplifying the model for acquisition of shared session keys using unique platform keys, protection of these keys using hardware, and full line-rate cryptography using additional hardware support. The described embodiments may provide and improve hardware-based cryptographic solutions for supporting hop-by-hop IEEE 802.1ae and end-to-end IPsec security solutions to operate at full wire speeds such as at 10 Gbps and beyond.

In various implementations, the described embodiments may construct a codebook and perform group key assignment techniques to achieve security and traceability. For example, shared key distribution techniques enable auditing and traceability even in shared key scenarios, where a compromised system has access to the shared key. At the same time, the performance and deployment benefits of shared key environments are maintained. Accordingly, the described embodiments enable level of auditing and traceability with a constant number of security associations that previously was only achieved with expensive polynomial point-to-point security associations.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

In various implementations, for example, the described embodiments may comprise one or more software programs such as a software program in a key-distribution server to assign the keys according to a group key assignment schedule, a software program in a client platform to perform a security handshake with the key-distribution server, a software program in an application server platform to perform a security handshake with the key-distribution server, and a software program to analyze application server security association logs to accurately trace the intruders.

In various implementations, for example, the described embodiments may comprise one or more hardware modules, such as a hardware module in a client platform to perform data encryption and authentication for the communication with an application server, a hardware module in an application server platform to perform data encryption and authentication for the communication with client.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

Some embodiments may be implemented as an article of manufacture comprising a computer-readable storage medium to store executable instructions for performing various operations as described herein. The computer-readable storage medium may include one or more types of storage media capable of storing data, including volatile memory or, non-volatile memory, removable or non-removable memory, erasable or non-erasable memory, writeable or re-writeable memory, and so forth. The computer-readable medium may store instructions that, if executed by a computing system, may cause the computing system to perform a method and/or operations in accordance with the described embodiments. Such a computing system may include, for example, any suitable computing platform, computing device, computer, processing platform, processing system, processor, or the like implemented using any suitable combination of hardware and/or software.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A shared security association system comprising:
a key distribution server comprising a CPU to provide shared security associations for clients and servers by assigning a group key to a particular client according to a time-based group key assignment schedule, the key distribution server comprising a recursive codebook including multiple entries corresponding to group key assignments to be selected by the CPU with respect to time intervals,
wherein the CPU to assign a group key to a particular client by finding a particular entry in the recursive codebook for the particular client for a given time interval, identifying a group of randomly selected clients within the entry to which the particular client belongs based on the given time interval, and providing the particular client with a corresponding group key for the identified group.

2. The shared security association system of claim 1, the group key assignment schedule calculated by dividing entries in the recursive codebook according to a number of groups and associating different group keys with different groups.

3. The shared security association system of claim 1, the CPU to provide group keys to clients and application servers over secure channels using a standard public key protocol.

4. The shared security association of claim 1, the recursive codebook to enable intruder traceability.

5. The shared security association system of claim 4 to trace an intruder by finding intervals of interest from logs of group keys, finding group keys of interest from the logs, finding corresponding group member sets of clients from the group key assignment schedule, and determining which client is the intruder by intersecting the group member sets.

6. The shared security association of claim 1, further comprising an enterprise security key implemented by at least one of a client platform, a server platform, and a frame.

7. A mobile system comprising an antenna coupled to the shared security association system of claim 1.

8. A computer-implemented method for providing shared security associations for clients and servers comprising:
constructing a recursive codebook including multiple entries corresponding to group key assignments;
selecting entries with respect to time intervals; and
assigning a group key to a particular client according to a time-based group key assignment schedule, wherein the client comprises a computing system and assigning a group key comprises:
finding a particular entry in the recursive codebook for the particular client for a given time interval;
identifying a group of randomly selected clients within the entry to which the particular client belongs based on the given time interval; and
providing the particular client with a corresponding group key for the identified group via at least one communication link coupled to the particular client.

9. The computer-implemented method of claim 8, comprising calculating the group key assignment schedule by dividing entries in the recursive codebook according to a number of groups and associating different group keys with different groups.

10. The computer-implemented method of claim 8, comprising providing group keys to clients and application servers over secure channels using a standard public key protocol, each secure channel comprising at least one communication link.

11. The computer-implemented method of claim 8, comprising tracing an intruder.

12. The computer-implemented method of claim 11, comprising:
finding intervals of interest from logs of group keys;
finding group keys of interest from the logs;
finding corresponding group member sets of clients from the group key assignment schedule; and
determine which client is the intruder by intersecting the group member sets.

13. An article of manufacture comprising a non-transitory computer-readable storage medium containing instructions that if executed enable a computing system to perform the method of claim 8.

* * * * *

UNITED STATES PATENT AND TRADEMARK OFFICE
CERTIFICATE OF CORRECTION

PATENT NO. : 8,411,868 B2
APPLICATION NO. : 11/694717
DATED : April 2, 2013
INVENTOR(S) : Men Long et al.

It is certified that error appears in the above-identified patent and that said Letters Patent is hereby corrected as shown below:

In the Claims:

In column 9, line 26, in claim 4, delete "of" and insert -- system of --, therefor.

In column 9, line 34, in claim 6, delete "of" and insert -- system of --, therefor.

Signed and Sealed this
Twenty-first Day of May, 2013

Teresa Stanek Rea
*Acting Director of the United States Patent and Trademark Office*